| United States Patent [19] | [11] | 4,117,066 |
| --- | --- | --- |
| Mollet et al. | [45] | Sep. 26, 1978 |

[54] NOVEL PROCESS FOR THE COMPLETE ISOLATION AND RAPID DRYING OF SOLIDS FROM SUSPENSIONS

[75] Inventors: Hans Mollet, Reinach; Roland Häberli, Würenlingen; Alberto Rabassa, Kleindöttingen; Fridolin Bäbler, Allschwil, all of Switzerland

[73] Assignee: Ciba-Geigy AG, Basel, Switzerland

[21] Appl. No.: 764,111

[22] Filed: Jan. 31, 1977

Related U.S. Application Data

[63] Continuation of Ser. No. 575,117, May 6, 1975, abandoned.

[30] Foreign Application Priority Data

May 10, 1974 [CH] Switzerland .......................... 6425/74

[51] Int. Cl.$^2$ ................................................ B01J 2/06
[52] U.S. Cl. ...................................... 264/117; 260/208
[58] Field of Search ...................... 264/117, 9; 260/208

[56] References Cited

U.S. PATENT DOCUMENTS

| 3,169,955 | 2/1965 | Siebert | 260/176 |
| 3,591,671 | 7/1971 | Burt et al. | 264/117 |
| 3,804,824 | 4/1974 | Kaiser et al. | 260/208 |

Primary Examiner—Robert F. White
Assistant Examiner—James R. Hall
Attorney, Agent, or Firm—Edward McC. Roberts; Michael W. Glynn; Prabodh I. Almaula

[57] ABSTRACT

A novel process for the complete isolation and rapid drying of a solid, or mixtures of solids, from a suspension, is described in that there is added to the aqueous or organic suspension containing said solid an additional liquid, or a mixture of such liquids, which is a solvent for the solid contained in the suspension, and which liquid is insoluble, or soluble to only a limited extent, in the suspension liquid, in such a way that a multiphase system is formed; and the mixture is maintained in a state of intense turbulence until agglomerates of the solid are formed; and this is then seperated from the multiphase system and optionally dried.

5 Claims, No Drawings

NOVEL PROCESS FOR THE COMPLETE ISOLATION AND RAPID DRYING OF SOLIDS FROM SUSPENSIONS

This is a continuation of Ser. No. 575,117, filed on May 6, 1975, now abandoned.

The invention relates to a novel process for the complete isolation and rapid drying of solids from suspensions, as well as to the solids isolated by this process.

The complete and rapid isolation of suspended solids still constitutes a problem hitherto unsolved. A solid which is in the form of a dispersion or suspension is normally separated by filtration of the liquid medium; in this process, however, a proportion of the solid substance, which is very finely dispersed, frequently cannot be separated by filtration and hence creates a waste-liquor problem. The drying of the filter cake obtained in this manner presents a further problem, namely that firstly the solid content of these filter cakes is generally below 40 percent by weight, and secondly that filter cakes have only a very small specific surface area, which renders possible only very slow drying. Various suggestions have been made to overcome these disadvantages: for example to improve the filterable form by regulation of the precipitation conditions, such as, e.g., by modification of the pH value, by the addition of salt, or by the addition of filtration auxiliaries. All these processes, however, represent only a gradual improvement, without providing a general solution to the problem.

There is thus known from U.S. Pat. No. 3,804,824 a process by which organic azo pigments are agglomerated from an aqueous suspension by the addition of an organic solvent that is insoluble in water and has a lower density than water. There are obtained by this process however agglomerates having such unfavourable physical properties with regard to, e.g., size and density, that they can be separated only with the aid of a centrifuging process.

It is also known that attempts have been made to solve the problem of isolation, and also of drying, by use of spray drying. But this method too, especially in the case of solids sensitive to temperature, has its disadvantages and requires moreover very expensive equipment. Finally, the expenditure of energy for all the drying processes mentioned is to a lesser or greater extent high. For this reason, efforts have been made to accelerate the drying of solids which are obtained in the form of press cakes by, for example, compressing these or converting them by extrusion into ribbons or rods, so that they acquire a greater surface area and can thus be more easily dried.

A novel process has now been found for the complete isolation and rapid drying of solids from suspensions or dispersions, which process surprisingly overcomes all the disadvantages mentioned and, in addition, offers further advantages. This novel process of the invention for the isolation and drying of solids from suspensions is characterised in that to the solids, or mixtures of solids, to be isolated, which are present in a suspension, there is added an additional liquid, or a mixture of such liquids, which is a solvent for these solids, and which is insoluble, or soluble to only a limited extent, in the suspension liquid, in such a way that a multiphase system is formed; and the mixture is then maintained in a state of intense turbulence until agglomerates of these solids are formed; and these agglomerates are thereupon removed from the multiphase system and optionally dried.

The use of an additional liquid which has the property of being partially soluble in the suspension liquid is advantageous in the case of suspensions of solids having an extremely low solid content, e.g. below 1%, because the granulating process as a result proceeds at an accelerated rate.

The solids can be homogeneous substances, preferably of an organic nature, or mixtures of substances. They can be, for example, dyestuffs, pigments, optical brighteners, textile auxiliaries, pharmaceutical products, pest-control agents, antimicrobics and bacteriostatics, detergents, paper auxiliaries (e.g. sizing agents), photochemicals, leather chemicals, plastics, polymers and plastics derivatives, as well as foodstuffs. These substances can be pure, or they can contain extenders, e.g. salts or other constituents.

By dyestuffs as substances are meant in this connection all possible classes, both coloristically and chemically, which are suitable for an aqueous and organic application. There are mentioned, for example: basic dyestuffs, acid dyestuffs, sulphur dyestuffs, vat dyestuffs, mordant dyestuffs, chrome dyestuffs, disperse dyestuffs and direct dyestuffs; and these dyestuffs can contain in the molecule fibre-reactive groups. It is obvious that also foodstuffs and leather dyestuffs can be included.

Chemical classes of dyestuffs concerned are, e.g.: nitroso, nitro, monoazo, disazo, trisazo, polyazo, stilbene, carotenoid, diphenylmethane, triarylmethane, xanthene, acridine, quinoline, methine, thiazole, indamine, indophenol, azine, oxazine; thiazine, lactone, aminoketone, hydroxyketone, anthraquinone, indigoid and phthalocyanine dyestuffs as well as 1:1- or 1:2-metal-complex dyestuffs.

Pigments as substances are preferably those of an organic nature: they are, for example, azo, azomethine, anthraquinone, phthalocyanine, nitro, perinone, perylenetetracarboxylic acid diimide, dioxazine, thioindigo, iminoisoindolinone or quinacridone pigments. Suitable also are metal complexes, e.g. of azo, azomethine or methine dyestuffs having pigment character. Also mixtures of various pigments can be used.

As optical brighteners used for white tinting, it is possible to use those of all classes. Such brighteners are, for example, stilbene compounds such as cyanur derivatives of 4,4'-diaminostilbene-2,2'-disulphonic acid or distyryl-biphenyls, coumarins, benzocoumarins, pyrazines, pyrazolines, oxazines, mono- or dibenzoxazolyl or mono- or dibenzimidazolyl compounds, as well as naphthalic acid imides, naphthotriazole and v-triazole derivatives.

By textile auxiliaries are meant chemicals that are required in the processing of the various textile fibres into finished fabrics; these chemicals are, for example, raw wool detergents, lubricants, sizing agents, milling agents, impregnating agents, preservatives, finishing agents, desizing agents, bucking agents, bleaching auxiliaries, dyeing auxiliaries such as dispersing agents and levelling agents, printing auxiliaries, carbonising auxiliaries, mercerising auxiliaries, preparations for the obtainment of resistance to creasing and shrinking, and antistatic preparations.

Pest-control agents are universally known. They are used, e.g., for the destruction of plant pests (e.g. fungicides, insecticides, acaricides, nematicides, molluscicides and rodenticides), and for the prevention of plant diseases, and can likewise be easily separated according to the invention from suspensions or dispersions.

By antimicrobics are meant antimicrobial substances which are intended to, or serve to, retard or prevent disadvantageous changes in foodstuffs caused by microorganisms.

Bacteriostatics are substances which inhibit or prevent the growth of bacteria.

By detergents are meant such substances that are formed, for example, from (a) a surface-active synthetic substance, a washing raw material, (b) a washing auxiliary (detergent additive), (c) special additives, such as sodium perborate, magnesium silicate, optical bleaching agents, wetting agents, etc., and (b) diluents. Both the detergents as such and the individual constituents can be isolated and dried according to the invention.

All these substances can be rapidly isolated, both in the pure state and in the commercial form, from an aqueous or organic suspension, or from moist press cake containing aqueous or organic solvents. In particular, however, it is possible to use suspensions, e.g. such as occur after synthesis of the solids, or such as are precipitated from reaction solutions, for example, by the addition of salts. The process is however also applicable to, e.g., flocculated sediments such as arise, e.g., in wasteliquor purification.

Liquids which serve as a suspension medium for the solid substance are either water or organic liquids, or mixtures thereof.

A suitable additional liquid, which preferentially is a solvent for the solid substance, is a liquid insoluble, or soluble to only a limited extent, in the suspension liquid. In the case where the suspension liquid is water, there is used as the additional liquid an organic liquid or a mixture of organic liquids; and in the case where the suspension liquid is an organic liquid or a mixture of organic liquids, there is used water and/or another organic liquid or a mixture of such organic liquids. By limited solubility is meant in this case that up to about 20% of the additional liquid is soluble in the suspension liquid at 20° C. Thus, there are principally three possibilities, namely:

a. suspension liquid: water, additional liquid: organic liquid or mixture of organic liquids;
b. suspension liquid: organic liquid or mixture of organic liquids, additional liquid: water;
c. suspension liquid: organic liquid or mixture of organic liquids, additional liquid: as defined, an organic liquid different from the suspension liquid, or a mixture of such organic liquids.

To which of the three possibilities preference is to be given will depend on the solids concerned.

The requirements to be met by the organic liquids for bringing about the agglomeration are dependent on the nature of the respective solid to be agglomerated. The organic liquids are, for example, alcohols such as 2-ethyl-1-hexanol, ethanol and butanol; aliphatic hydrocarbons, both open-chain and ring-shaped, such as n-hexane and ligroin or cyclohexane; aromatic hydrocarbons such as benzene, chlorobenzene, xylene and toluene; halogenated aliphatic hydrocarbons such as trichloroethane, carbon tetrachloride, methylene chloride, chloroform and perchloroethylene, or mixed halogenated hydrocarbons, such as those known under the trade-name of "Frigen", e.g. trichlorotrifluoroethane (Frigen 113 CR), as well as esters such as ethyl acetate. Also suitable, as defined, are mixtures of organic liquids, advantageously in the ratio of 1:1.

The additional liquid is used, in relation to the first liquid or to the solid substance, in an amount dependent on, e.g., the concentration of the solid in the suspension, on the affinity of the second liquid for the solid, on the particle size of the solid, as well as on the solubility of the second liquid in the first liquid.

The process according to the invention consists in adding to the suspension or dispersion containing the solid to be isolated or dried an additional liquid, or a mixture of such liquids, which is insoluble, or soluble to only a limited extent, in the suspension liquid, and which preferentially is a solvent for this solid, in such a way that a multiphase system is formed; and simultaneously bringing this mixture into a state of intense turbulence. This is effected, for example, by using a Vibro mixer or by operating in a shaking machine or Turbula. Agglomerates of solids are then formed in the multiphase system; the size of these agglomerates can be varied by the process conditions, and in general it is above 200 microns.

These agglomerates are separated from the liquid multiphase system in a manner known per se, e.g. by continuous or discontinuous methods, e.g. by use of suction filters, filter presses or sieves, or by decantation or flotation, or by a combination of these methods, and optionally dried by known methods.

The process according to the invention constitutes therefore a novel, more rational method of completely isolating and rapidly drying solids from suspensions by means of an agglomeration of these solids in a multiphase system. It offers in addition, however, the possibility of the selective separation of impurities or by-products. Compared with the known processes initially mentioned, this process has the advantage that it can be applied generally to all solids; that it ensures a rapid and complete isolation of the agglomerates from the multiphase system, with no, or only very little, solid substance remaining in the filtrate, so that no waste-liquor problem arises; that the specific surface area of the moist agglomerates of solids is large compared with that for example of conventional press cakes, thus rendering possible more rapid drying of the solids; that a lower moisture content is present in the agglomerates, since the major part of the liquids is separated mechanically, a factor representing a saving in energy by virtue of the drying temperatures and times also being lower; and that the use of, in particular, a low-boiling additional liquid enables a lower drying temperature to be applied and hence ensures a more gentle drying.

It is particularly surprising that the process is applicable also to substances that are partially soluble in the additional liquid, for in these cases too there are formed predominantly spherical agglomerates and not continuous masses of substance.

It is furthermore surprising that even very fine solid particles in the range of below 1 micron, which may be contained in the suspension, become agglomerated in the process, so that in general there are no further solids present in the filtrate. It is this provision of rapid and simple concentration and drying of such sediments that is of great importance for the purification of waste liquor.

The following examples illustrate the invention without the scope thereof being limited to them. Temperature values are given in degrees Centigrade.

EXAMPLE 1

35 g of an aqueous dyestuff press cake containing 17.5 g of the dyestuff of the formula

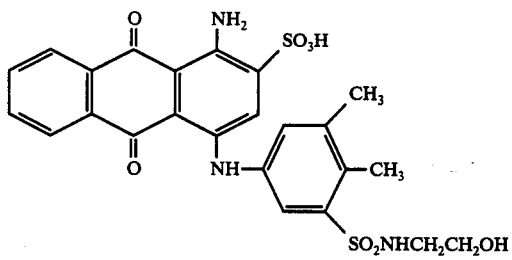

is stirred in 60 g of n-butanol for about 10 minutes. There is subsequently added 100 g of Frigen 113 at approx. 1000 r.p.m. To effect agglomeration, an addition is then slowly made dropwise, with turbulent stirring, of 6.7 g of water. Agglomerates are formed which are easily separated and dried in a drying cupboard at 50°. In contrast to known methods of isolation, this agglomeration of the solid substance in the suspension renders possible a very rapid and complete separation of the dyestuff from the suspension medium, with the filtrate containing no further dyestuff. In addition, the large specific surface area of the resulting agglomerates, compared with the specific surface area of the press cake, makes possible an appreciably more rapid drying.

EXAMPLE 2

100 g of aqueous dyestuff press cake containing 20 g of dyestuff of the formula

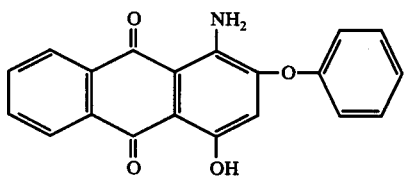

is turbulently stirred, as methylene chloride is slowly being added (20 percent by weight relative to the amount of dry dyestuff), for about 10 minutes at room temperature; there are formed agglomerates of the dyestuff, which are subsequently separated and dried. It is possible by means of this process to rapidly and completely isolate the dyestuff from the suspension, and to speedily convert it into a dry form.

The evaporation of 20 percent by weight of methylene chloride (relative to the dyestuff) requires considerably less energy and time than the evaporation of 80 percent by weight of water in the aqueous press cake. Furthermore, drying is performed under mild conditions.

EXAMPLE 3

An aqueous dyestuff press cake containing the dyestuff of the formula

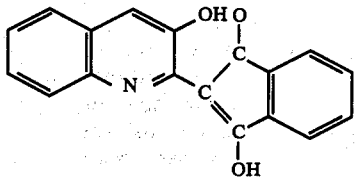

is turbulently stirred, as methylene chloride is being added (10 percent by weight relative to the amount of dry dyestuff), for about 15 minutes; there are formed agglomerates of the dyestuff, which are subsequently separated and dried. The process renders possible a more rapid isolation and drying of the dyestuff than that obtained, for example, in the case of spray drying of the same material.

The water when separated is clear, so that an expensive purification of the waste water is no longer required.

EXAMPLE 4

An aqueous dyestuff press cake containing the dyestuff of the formula

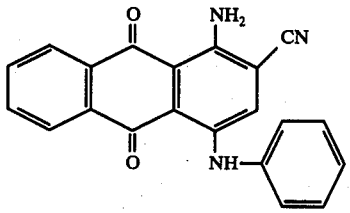

is turbulently stirred, as toluene is being slowly added (20 percent by weight relative to the amount of dry dyestuff), for about 10 minutes at room temperature; there are formed agglomerates of the dyestuff, which are subsequently separated and dried.

EXAMPLE 5

100 ml of n-butanol is added to 50 g of aqueous activated sludge (dry content 4%). By the shaking or stirring of this mixture there are obtained granules of 1 to 2 mm diameter. These are separated by means of a sieve of 600 μ mesh size from the butanol and the water dissolved therein. The moisture content of the granules, consisting of water/butanol, is 80%; the granules are subsequently dried in an oven.

EXAMPLE 6

200 ml of an aqueous pigment suspension containing 10 g of the finely dispersed yellow pigment of the formula

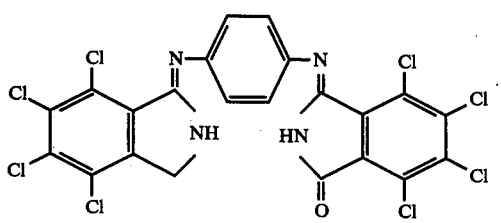

is placed into a stirring vessel. Within about 20 minutes there is added dropwise at room temperature, with stirring, 12 ml of xylene. The pigment becomes wetted by the xylene and forms therewith agglomerates which, in consequence of the hydrophobic solvent, can be very easily separated from the water by filtration. The solvent-containing agglomerates are subsequently freed in a vacuum chamber from the solvent, dried and optionally pulverised. There is obtained a dry pigment which, on being incorporated in the usual manner into, e.g., soft polyvinyl chloride sheets, displays good dispersion and coloristic properties.

EXAMPLE 7

If the procedure is carried out as in Example 6 with use however of an aqueous suspension containing, instead of the yellow pigment, the red pigment of the formula

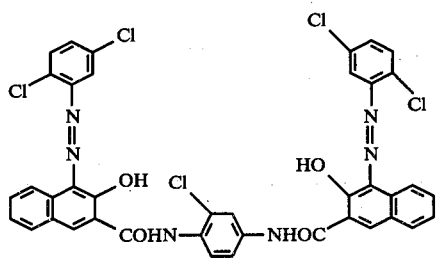

and, instead of 12 ml of xylene, 14 ml of cyclohexane, with the procedure otherwise being the same, then there is obtained an equally easily filterable mixture, and a dry pigment having equally good properties on application.

EXAMPLE 8

If the procedure employed is analogous to that of Example 6 except that there is used, instead of the yellow pigment, a blue Cu-phthalocyanine pigment and, instead of 12 ml of xylene, 8 ml of toluene, then likewise there is obtained a very easily filterable mixture, and a dry pigment of equally good quality.

EXAMPLE 9

If the procedure is carried out as in Example 6 with use however of an aqueous suspension containing as yellow pigment a pigment of the formula

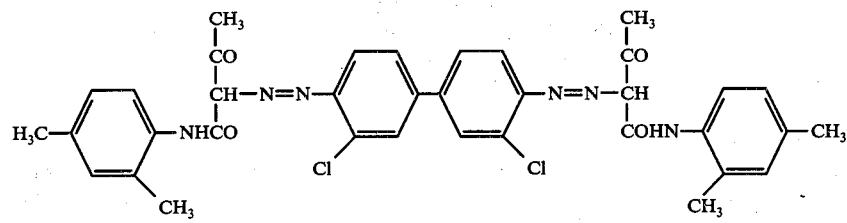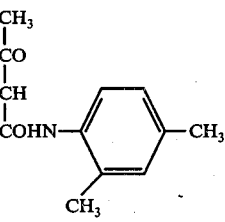

and 10 ml of trichloroethane instead of 12 ml of xylene, then the same advantages on filtration are obtained and the resulting dry pigment is of equally good quality.

EXAMPLE 10

100 g of a synthesised suspension consisting of 16 percent by weight of dyestuff (particle size about 20 μ) of the formula

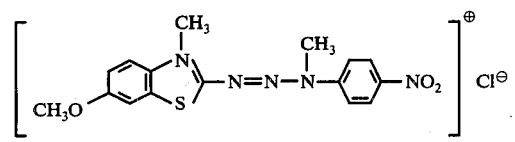

and 84 percent by weight of chlorobenzene is turbulently stirred with the addition of 10 g of a 5% (by weight) aqueous Antaron dispersion (Antaron V-904). After a very short time there are formed dyestuff granules of about 1 mm diameter, which are separated and dried. It is possible by this process to rapidly and completely isolate the dyestuff from the suspension, and to convert it speedily into a dry form.

We claim:

1. A process for the agglomeration of solid suspended particles in a multiphase system comprising:
  a. forming a suspension of the solid particles in a first liquid;
  b. gradually adding to said suspension at room temperature, a second liquid which is soluble to the extent of up to about 20% in the first liquid at 20° C and in which second liquid the solid substance is partially soluble, in an agglomerating amount such that a multiphase system is formed and said solid substance is partially dissolved by said second liquid;
  c. simultaneously agitating said multiphase system by intense turbulence until agglomerates of said solid particles are formed;
  d. separating said agglomerates from the multiphase system; and
  e. drying the separated agglomerates.

2. The process according to claim 1, wherein said solid particles are selected from the group consisting of dyestuffs, organic pigments, optical brighteners, textile auxiliaries, pharmaceuticals, pest-control agents, antimicrobics, bacteriostatics, detergents, paper auxiliaries, photochemicals, leather chemicals, plastics, polymers and plastic additives.

3. The process according to claim 1, wherein the agglomerates are separated from the multiphase system by filtration.

4. The process according to claim 1, wherein the agglomerates are separated from the multiphase system by decantation.

5. The process according to claim 1, wherein the agglomerates are separated by flotation.

* * * * *

UNITED STATES PATENT AND TRADEMARK OFFICE
CERTIFICATE OF CORRECTION

PATENT NO. : 4,117,066
DATED : September 26, 1978
INVENTOR(S) : HANS MOLLET ET AL.

It is certified that error appears in the above-identified patent and that said Letters Patent are hereby corrected as shown below:

On the face of the patent, item [73], change the "Assignee" from CIBA-GEIGY AG, Basel, Switzerland to -- CIBA-GEIGY Corporation, Ardsley, New York --.

Signed and Sealed this

Tenth Day of April 1979

[SEAL]

Attest:

RUTH C. MASON
Attesting Officer

DONALD W. BANNER
Commissioner of Patents and Trademarks